United States Patent [19]
Kraft et al.

[11] Patent Number: 5,798,820
[45] Date of Patent: Aug. 25, 1998

[54] METHOD FOR PRODUCING COPIES FROM PHOTOGRAPHIC ORIGINALS

[75] Inventors: Walter Kraft, Zürich; Peter Zolliker, Dielsdorf, both of Switzerland

[73] Assignee: Gretag Imaging AG, Regensdorf, Switzerland

[21] Appl. No.: 834,982

[22] Filed: Apr. 7, 1997

[30] Foreign Application Priority Data

Apr. 16, 1996 [EP] European Pat. Off. .............. 96810235

[51] Int. Cl.$^6$ .............................................. G03B 27/32
[52] U.S. Cl. ............................ 355/40; 355/41; 355/68; 355/71
[58] Field of Search ........................... 355/18, 38, 40, 355/41, 77, 68

[56] References Cited

U.S. PATENT DOCUMENTS 3,797,719  3/1974  Tall et al. .

FOREIGN PATENT DOCUMENTS

| 0 012 713A1 | 10/1979 | European Pat. Off. . |
| 15 97 066 | 9/1976 | Germany . |
| 25 35 034 | 2/1977 | Germany . |
| 26 36 337 | 2/1977 | Germany . |
| 29 39 681A1 | 4/1981 | Germany . |
| 34 08 765A1 | 9/1985 | Germany . |

OTHER PUBLICATIONS

Gretag Operating Manual Program 8.30 (DG 500) Gretag 3141 Scanning Color Printer, Edition 1, pp. 1-1-10-9.

*Primary Examiner*—A. A. Mathews
*Attorney, Agent, or Firm*—Burns, Doane, Swecker & Mathis, L.L.P.

[57] ABSTRACT

A method for producing copies of photographic originals, wherein an original is scanned regionally. With the aid of measurement data thus obtained, a decision is made in a test step, on the basis of specified criteria, whether the original is worth copying or not. On the basis of this decision, the particular original is or is not copied onto photographic copy material. In the test step, the scanned original is assigned to at least one of at least three categories of originals; namely a first category which includes originals that are unequivocally worth copying, a second category which includes originals that are unequivocally not worth copying, or a third category which includes originals that are neither unequivocally worth copying nor unequivocally not worth copying. Both originals assigned to the first category and originals assigned to the third category are copied onto photographic copy material, and the copies of originals assigned to the third category are specifically identified as belonging to that category and are not included in calculating the price for processing the customer's order.

15 Claims, 2 Drawing Sheets

METHOD FOR PRODUCING COPIES FROM PHOTOGRAPHIC ORIGINALS

BACKGROUND OF THE INVENTION

1. Field of the Invention

The invention relates to a method for producing copies from photographic originals.

2. State of the Art

Today, making copies from photographic originals is done more or less fully automatically. What is done most often is copying exposed frames from negative films onto light-sensitive photographic paper, and for that reason, such a case is addressed hereinafter. The procedure is typically such that the various frames of the negative films are scanned in a measuring station; then with the measurement data obtained, the data for controlling the exposure are ascertained, so that finally in the exposure station, with exposure to light, the various frames of the negative film are copied onto the light-sensitive photographic paper with the requisite amounts of copying light.

In automatic photofinishing, it has also become usual for the copiers used (known as printers) to be capable of distinguishing between frames worth copying and those not worth copying. The decision of whether a negative is worth copying or not can be influenced by various criteria (such as contrast, exposure, image sharpness, etc.). Regardless of which criterion or criteria are used in making the decision of copy-worthiness, this decision is a "yes/no" decision: either the frame is copied, or not. For deciding when a frame is worth copying and when it is not, one skilled in the art generally has a set of variable parameters available. However, again and again, it has been found that customers are unhappy when no copies have been made of some of their frames because they failed the above "yes/no" decision, or in other words because they were classified as not worth copying, yet the customer looking at these frames on the negative film has the clear sense that an acceptable copy could be made from them.

Given a simple "yes/no" decision, however, no other outcome is in principle possible, from the technical or systematic standpoint. Somewhere, some criterion, or a number of criteria, must be defined with whose aid a decision is made as to whether a frame is classified as worth copying or not worth copying. The aforementioned customer complaint—namely that no copies were made of some frames—has therefore sometimes resulted in an attendant "softening" of the criteria for deciding whether a frame is worth copying. As a consequence of the "softened" criteria, a few unacceptable copies have now been included in individual orders, which also leads to customer dissatisfaction, especially since the customer—or the order acceptance point (a photofinishing store, for example), if it absorbs this cost for the sake of fairness—has to pay for all the copies, including unacceptable ones.

OBJECT AND SUMMARY OF THE INVENTION

It is therefore an object of the invention to increase satisfaction on the part of the customer and order acceptance point. In cases where it cannot be determined without doubt that the appropriate frame is unequivocally not worth copying, the customer should also be given the feeling that a copy is made but not charged for. At the same time, naturally, fully automatic processing of customer's orders should continue to be possible.

According to an exemplary method of the invention, in a test step, a particular scanned original is assigned to at least one of at least three categories of originals, namely either a first category, which includes originals that are unequivocally worth copying, or a second category which includes originals that are unequivocally not worth copying, or a third category which includes originals that are neither unequivocally worth copying nor unequivocally not worth copying. Both originals assigned to the first category and originals assigned to the third category are copied onto photographic copy material. However, the copies of originals assigned to the third category are specifically identified as belonging to that category and are not included in calculating the price for processing the customer's order.

Copies of originals that have been assigned to the third category are identified as such, using for example, a back-side printer, an adhesive label, or grease pen, so that the customer can immediately see with his own eyes that this is a copy of a negative that was not classified as unequivocally worth copying, and thus the making of that (free) copy was not included in calculating the price for the order.

According to another exemplary variant method, the assignment of the original to the first, second or third category is done before the requisite amounts of copy light are calculated. For originals that are assigned to the second category, no calculation of the quantities of copying light is initiated in the first place. This means nothing other than that for originals that are unequivocally not worth copying, the quantities of copying light are not even calculated at all, and so the attendant effort of calculation need not be exerted.

According to another exemplary variant method, before the test step, in which the original is assigned to the first, second or third category, the original is examined in a preliminary test step to find out whether it has been exposed at all, or is entirely black. This involves a more or less rough preliminary examination of the original. To put it plainly: before the original is examined more precisely and assigned to one of the categories, the original is first examined to find out whether it includes any image information at all, or whether the original might be completely black (which can be due to mistakenly opening the back of a camera with the film in it, for instance). In those cases, naturally, no more-detailed examination of the original is needed, and the decision is made directly that this original is not worth copying. Hence the effort of examining the original in more detail and assigning it to one of the three categories can be dispensed with.

BRIEF DESCRIPTION OF THE DRAWINGS

The invention will be described in further detail below in conjunction with the drawings, wherein.

DETAILED DESCRIPTION OF THE PREFERRED EMBODIMENTS

Figure 1:
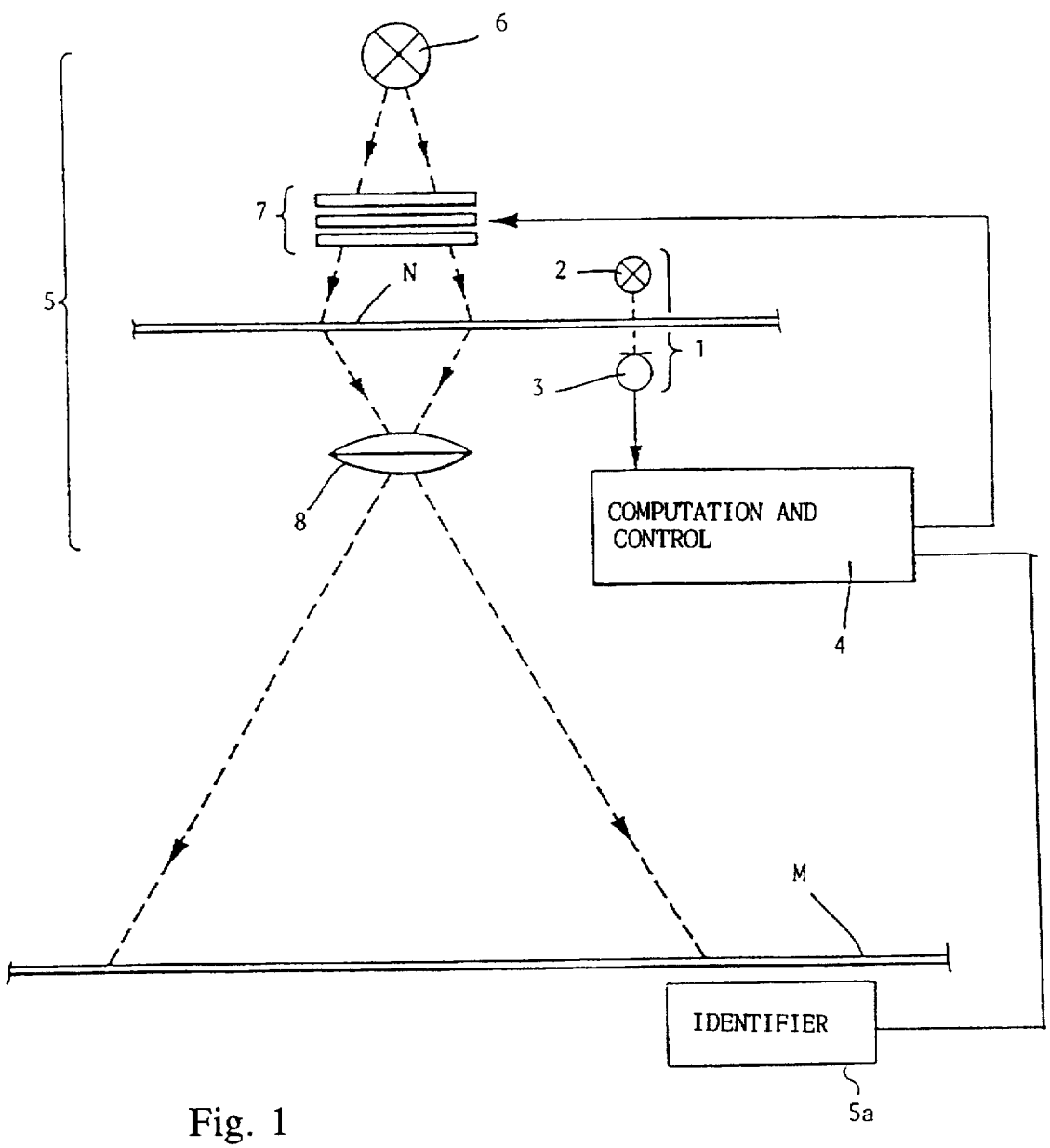
FIG. 1 schematically shows an exemplary embodiment of a copier apparatus for performing an exemplary method of the invention.

The exemplary embodiment shown in FIG. 1 of a copier with which an exemplary method of the invention can be performed essentially includes a measuring station 1, in which a transmissive original (in this case), such as a negative film N, is illuminated regionally. The exemplary regional illumination can, for example, be performed in a dot matrix, with the aid of a scanning light source 2.

Although a transmissive negative is illustrated, any original, including but not limited to positive film can of course be processed. A photoelectric receiver 3 is disposed on the far side of the negative film N and receives the scanning light arriving from the negative film N. The negative film N can, for example, be scanned in each individual scanning region in the three basic colors of blue, green and red, or by any state of the art spectral measurements.

The signal arriving from the photoelectric receiver 3 is delivered to a computation and control unit 4. The function of this computation and control unit 4 will be described in further detail hereinafter. At this point, however, it should be noted that the computation and control unit 4 controls the various servo-operated color filters 7 of the copying system 5 that can be swiveled into the path of the exposure beam. This overall copying system 5 includes a projection light source 6, the aforementioned servo-operated color filters 7, and a projection lens 8 disposed in the beam path downstream of the negative film N. The copying system 5 copies the particular frame of the film, which has previously been scanned in the measuring station 1, onto light-sensitive copy material, such as photographic paper M.

Up to this point, the method described corresponds to the prior art. Moreover, it is also known—as already noted at the outset—to examine the originals for whether they are worth copying at all, or not. However, until now this examination ended in a "yes/no" decision. That is, a decision for or against the copy-worthiness of the respective frame on the negative film N.

Figure 2:
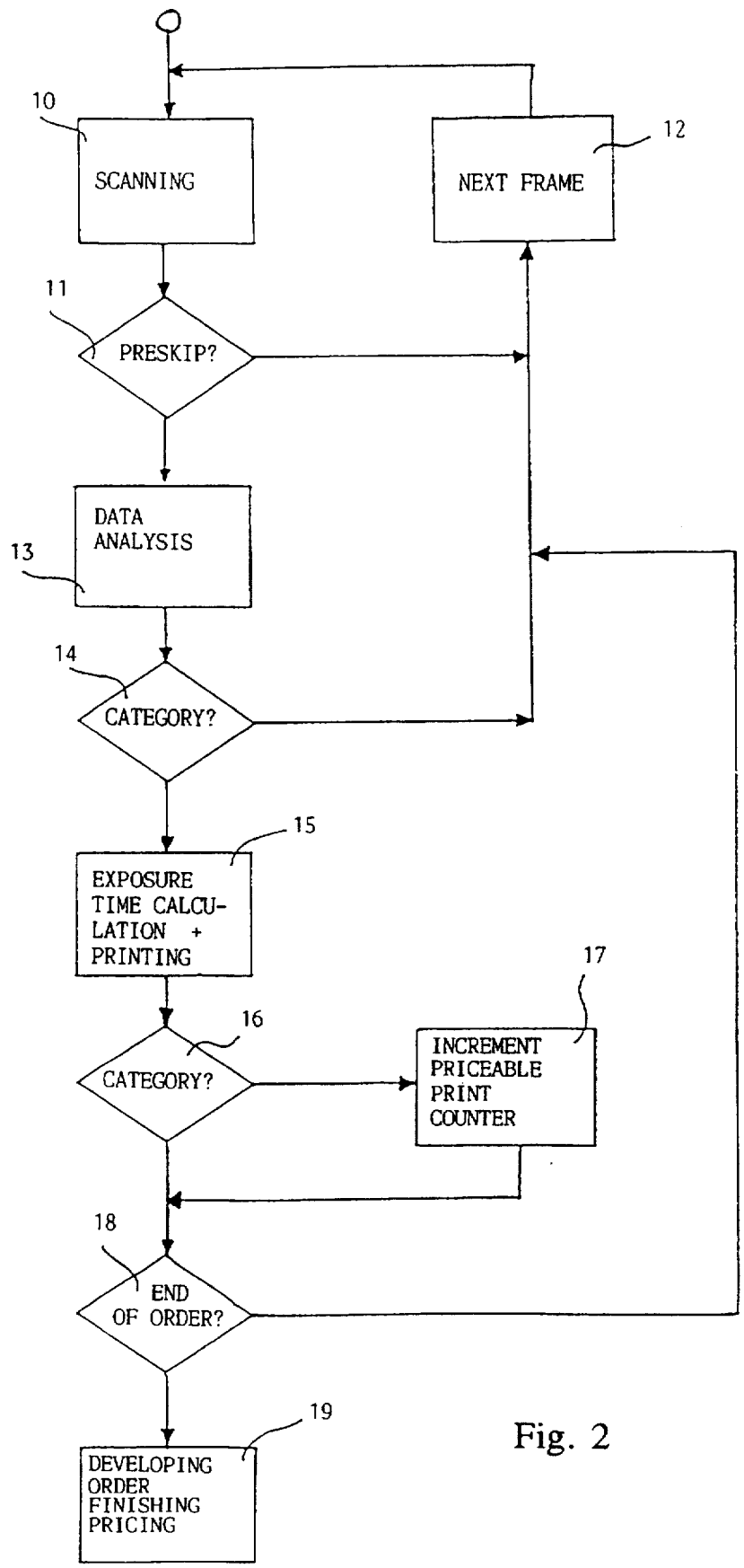
FIG. 2 is a flow chart, which shows an exemplary order of steps as they are done in the copier of FIG. 1, and includes a variant exemplary method of the invention.

It is at this point that an exemplary method of the invention makes a pronounced departure, in that—unlike the known method—it assigns the individual frames on the negative film to one of at least three different categories in terms of their copy-worthiness: either a first category, whose frames are unequivocally worth copying, or a second category, whose frames are unequivocally not worth copying, or a third category, whose frames are neither unequivocally worth copying or unequivocally not worth copying. Both frames that are unequivocally worth copying and frames that are neither unequivocally worth copying or unequivocally not worth copying, or in other words the frames of the first and third categories, are copied onto the photographic paper M in the copying station 5. However, copies of frames assigned to the third category can be identified as such and not taken into account in calculating the price for processing a customer's order (these copies are free). These processes will be explained in somewhat more detail below with the aid of the flow chart of FIG. 2. This flow chart shows the processes taking place in the copier, including a variant embodiment of the method of the invention.

First, in step 10, labeled "Scanning", the original is scanned. For example, one frame of the negative film N (FIG. 1) is scanned. This scanning is done in the measuring station 1 (FIG. 1) with the aid of the scanning light source 2 and the photoelectric receiver 3.

Steps 11–16 are performed in the computation and control unit (FIG. 1). After the frame has been scanned, an examination is made in a preliminary test step 11 labeled "Preskip" using the measurement data obtained in the scanning, to find out whether the film has any exposed frame at all at this point (that is, whether only the film mask is present, but no exposed film), or whether the frame is completely black (as can, for instance, happen if the back of a camera where the film is inserted is opened by mistake). It is clear that in these cases, no further analysis of the measurement data need be done, and naturally no exposure times have to be calculated, either. If one of these two exemplary cases occurs, then information is stored in memory accordingly so that this negative will not later be copied in the copying station 5 (FIG. 1). Next, the next frame is scanned. This is represented by step 12, which is labeled "Next Frame".

If neither of these two cases pertains, then in step 13, labeled "Data Analysis", an analysis of the measurement data of the frame is done. Various criteria (such as contrast, mean density, weighting of various zones within the frame, attenuation of the influence of larger cohesive areas of equal density, etc.) and evaluation philosophies, which are assumed to be known per se, can be taken into account. For example, the measurement data can be analyzed in the way described in any or all of European Patent Application EP-A-0,012,713, German Patent Disclosures DE-A 26 36 337, DE-B 15 97 066 and DE-A 25 35 034, and in the manual entitled "GRETAG 3141 Scanning Color Printer, Operating Manual Program 8.30 (DG 500)", the disclosures of which are hereby incorporated by reference in their entireties. Those skilled in the art will appreciate that the exact criteria chosen for processing any given type of film can be selected on a case-by-case basis using, for example, trial and error until acceptable criteria have been identified.

After the measurement data has been analyzed, the frame is assigned to one of the three categories. This is indicated by step 14, labeled "Category". If the frame is assigned to the second category, that is, the category of frames that are unequivocally not worth copying, then information is stored in memory accordingly so that this frame will not later be copied in the copying station 5 (FIG. 1). It is clear that in this case no exposure times have to be calculated either, and thus quite a considerable computation effort is dispensed with. Next, the next frame of the negative film N is scanned. This is represented by step 12, labeled "Next Frame".

Conversely, if the frame is assigned to the first category, that is, the category with the frames that are unequivocally worth copying, or the third category, that is, the category with the frames that are neither unequivocally worth copying nor unequivocally not worth copying, then in a step 15, labeled "Exposure time calculation+Printing", the exposure times are calculated in known fashion that are then used to control the servo-operated color filters 7 (FIG. 1) in projecting the frame onto the photographic paper M (FIG. 1).

Next, in step 16, labeled "Category", a determination is made as to whether the projected image is a copy of the frame of the first category, that is, the category with the frames unequivocally worth copying, or a copy of a frame of the third category, that is, the category with the frames that are neither unequivocally worth copying nor unequivocally not worth copying. If it is a copy of a frame of the first category, that is, a frame unequivocally worth copying, then in step 17, labeled "Increment priceable print counter", a counter is incremented that counts the copies for which a charge will later be made. Conversely, if it is a copy of a frame of the third category, that is, a frame that is neither unequivocally worth copying nor unequivocally not worth copying, then this counter is not incremented. This is because, although this frame was copied onto photographic paper M, the copying was done free to the customer. Moreover, according to a variant method of the present invention, such copies can also be identified in a special way. For example, the word "free" can be printed on the back side of such copies by means of an identifier 5a (FIG. 1), such as a back-side printer, or by placing a suitable label on such copies, or by identifying such copies with a grease pen (which can then be erased again by the customer), or in some other suitable way.

Next, in step 18, marked "End of order", it is examined whether this is the last image of a customer's order. If that is not the case, then the next frame is processed (step 12, "Next Frame"). However, once the end of a customer's order has been reached, still other known steps can take place, namely the developing of the exposed photographic paper, optionally cutting apart the exposed and developed photographic paper into individual copies, or cutting the negative films apart into individual strips (typically, strips with three to four frames each), unless that has already been done beforehand. Moreover, the film strips can be packed together with the associated copies in an envelope, and the price for processing the customer's order can be marked on the envelope. All of this is summarized in step 19, labeled "Developing, Order Finishing, Pricing". In calculating the price for processing the customer's order, the counter status is called up; this counts only the frames that are unequivocally worth copying (step 17), that is, frames that have been assigned to the first category. However, this is the great majority of all the copies involved.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for producing copies of photographic originals comprising the steps of:

scanning an original regionally to obtain measurement data;

determining in a test step whether the original is worth copying using specified criteria defined by variable parameters, the scanned original being assigned to at least one of at least three categories of originals, said at least three categories including a first category of originals that are unequivocally worth copying, a second category of originals that are unequivocally not worth copying, and a third category of originals that are neither unequivocally worth copying nor unequivocally not worth copying;

copying any originals assigned to the first category and originals assigned to the third category onto photographic copy material; and identifying copies of those originals assigned to the third category as such.

2. The method of claim 1, wherein said step of scanning an original includes scanning the original regionally in a dot matrix.

3. The method of claim 1, further including a step of:

excluding copied originals of said third category from a calculated processing price of a photographic copying order.

4. The method of claim 1, wherein copies of originals assigned to the third category are identified as such with at least one of a back-side printer, an adhesive label, and a grease pen.

5. The method of claim 1, wherein assignment of the original to at least one of the first, second and third category is done before requisite amounts of copy light are calculated for the original, and amounts of copying light are not calculated for originals that are assigned to the second category.

6. The method of claim 4, wherein assignment of the original to at least one of the first, second and third category is done before requisite amounts of copy light are calculated for the original, and amounts of copying light are not calculated for originals that are assigned to the second category.

7. The method of claim 1, wherein before the original is assigned to at least one of the first, second and third category, the original is examined in a preliminary test step to determine whether it is at least one of an unexposed original and an entirely black original.

8. The method of claim 4, wherein before the original is assigned to at least one of the first, second and third category, the original is examined in a preliminary test step to determine whether it is at least one of an unexposed original and an entirely black original.

9. The method of claim 5, wherein before the original is assigned to at least one of the first, second and third category, the original is examined in a preliminary test step to determine whether it is at least one of an unexposed original and an entirely black original.

10. Apparatus for producing copies of photographic originals comprising:

a measuring station for scanning an original regionally to obtain measurement data;

a copying system for copying originals onto photographic copy material;

a computation and control unit for determining in a test step whether the original is worth copying using specified criteria defined by variable parameters, the scanned original being assigned to at least one of at least three categories of originals, said at least three categories including a first category of originals that are unequivocally worth copying, a second category of originals that are unequivocally not worth copying, and a third category of originals that are neither unequivocally worth copying nor unequivocally not worth copying; and a means for identifying copies of originals assigned to the third category as such.

11. Apparatus according to claim 10, wherein said measuring station further includes:

a scanning light source for scanning the original regionally in a dot matrix; and a receiver disposed on a side of the original opposite a side on which said scanning light source is disposed.

12. Apparatus according to claim 10, wherein said copying system further includes:

servo-operated color filters controlled in response to an output from said computation and control unit.

13. Apparatus according to claim 10, wherein said computation and control unit identifies originals assigned to the third category as belonging to the third category.

14. Apparatus according to claim 10, wherein assignment of the original to at least one of the first, second and third categories is done before requisite amounts of copy light are calculated for the original, and amounts of copying light are not calculated for originals that are assigned to the second category.

15. Apparatus according to claim 10, wherein before an original is assigned to at least one of the first, second and third category, the original is reexamined by said computation and control unit in a preliminary test step to determine whether it is at least one of an unexposed original and an entirely black original.

* * * * *